(12) United States Patent  (10) Patent No.: US 7,938,436 B2
Lunt et al.  (45) Date of Patent: May 10, 2011

(54) SLIDE-ON INFLATOR HOUSING

(75) Inventors: Larry Frank Lunt, Brigham City, UT (US); Louis Mueller, Roy, UT (US)

(73) Assignee: Autoliv ASP, Inc., Ogden, UT (US)

( * ) Notice: Subject to any disclaimer, the term of this patent is extended or adjusted under 35 U.S.C. 154(b) by 300 days.

(21) Appl. No.: 12/021,550

(22) Filed: Jan. 29, 2008

(65) Prior Publication Data
US 2009/0189375 A1  Jul. 30, 2009

(51) Int. Cl.
*B60R 21/217* (2006.01)
*B60R 21/26* (2006.01)
(52) U.S. Cl. ..................... 280/728.2; 280/740
(58) Field of Classification Search ............... 280/728.2, 280/730.2, 740, 741
See application file for complete search history.

(56) References Cited

U.S. PATENT DOCUMENTS

| 4,153,273 | A | * | 5/1979 | Risko | 280/740 |
|---|---|---|---|---|---|
| 4,191,392 | A | * | 3/1980 | Barnett | 280/740 |
| 5,308,108 | A | * | 5/1994 | Rion | 280/728.2 |
| 5,498,029 | A |  | 3/1996 | Mossi et al. | |
| 5,611,563 | A |  | 3/1997 | Olson et al. | |
| 5,645,295 | A | * | 7/1997 | White et al. | 280/730.2 |
| 5,918,898 | A |  | 7/1999 | Wallner et al. | |
| 6,176,511 | B1 | * | 1/2001 | Adkisson et al. | 280/728.2 |
| 6,231,069 | B1 |  | 5/2001 | Yokoyama | |
| 7,597,351 | B2 | * | 10/2009 | Kashiwagi | 280/730.2 |
| 2005/0110244 | A1 | * | 5/2005 | Wheelwright et al. | 280/728.2 |
| 2006/0113765 | A1 | * | 6/2006 | Tracht | 280/730.2 |
| 2009/0039627 | A1 | * | 2/2009 | Yokota | 280/730.2 |

* cited by examiner

*Primary Examiner* — Paul N. Dickson
*Assistant Examiner* — George D. Spisich
(74) *Attorney, Agent, or Firm* — Sally J. Brown; Stoel Rives LLP

(57) ABSTRACT

An inflator assembly is disclosed for use in an automobile. The inflator assembly features a slide-on housing around an inflator.

25 Claims, 6 Drawing Sheets

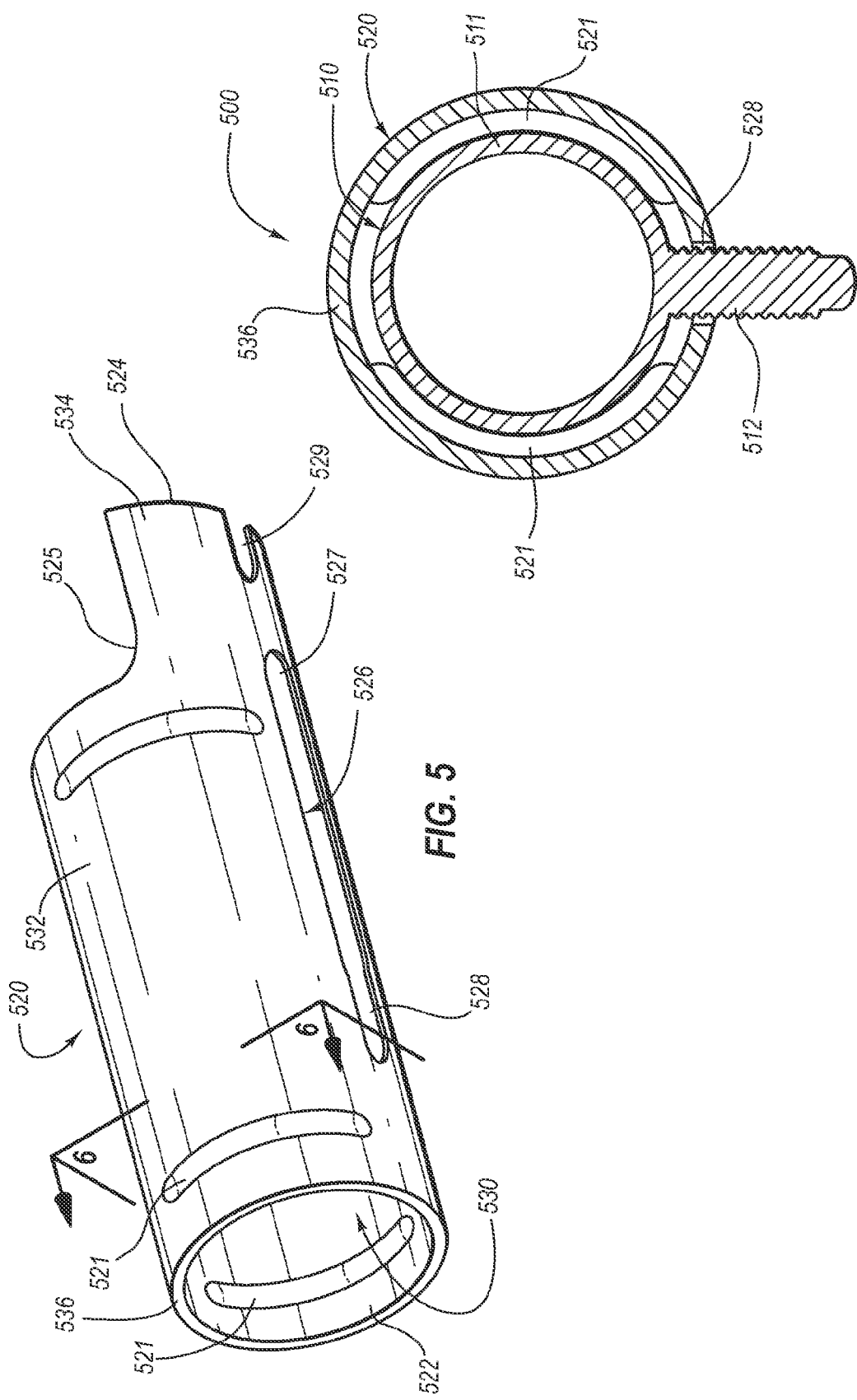

SLIDE-ON INFLATOR HOUSING

TECHNICAL FIELD

The present disclosure relates generally to the field of automotive protective systems. More specifically, the present disclosure relates to airbag inflator systems.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the scope of the present disclosure, the embodiments will be described and explained with specificity and detail in reference to the accompanying drawings as provided below.

FIG. 5 is a perspective view of another embodiment of an inflator housing, wherein the housing partially comprises ribs for centering an inflator.

FIG. 6 is a front elevation cutaway view of the inflator housing of FIG. 5, wherein an inflator has been slideably received by the housing.

Figure 1:
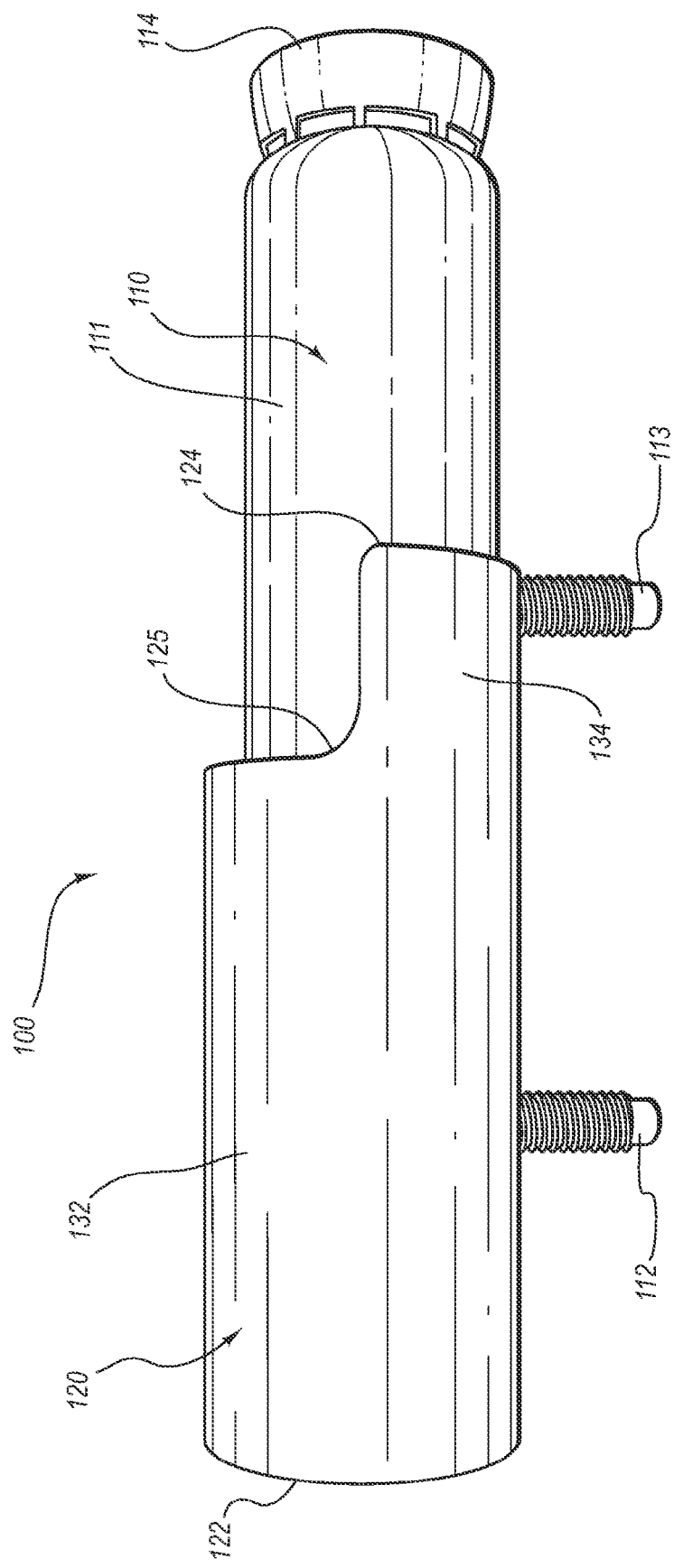
FIG. 1 is a side elevation view of one embodiment of an inflator assembly, having an inflator and an inflator housing.

INDEX OF ELEMENTS IDENTIFIED IN THE DRAWINGS 100 inflator assembly
110 inflator
111 body
112 diffuser proximal mounting stem
113 initiator proximal mounting stem
114 initiator end of inflator
116 diffuser end of inflator
117 shoulder
118 diffuser holes
120 housing
122 gas exit end of housing
124 receiving end
125 recessed portion of inflator housing
126 receiving aperture
127 slot
128 reduced portion
129 notch
130 chamber of housing
132 sidewall of housing body
134 extended portion
500 inflator assembly
510 inflator
511 inflator body
512 mounting hardware
520 inflator housing
521 ribs
522 gas exit end of housing
524 receiving end
525 recessed portion of housing body
526 receiving aperture
527 slot
528 reduced portion
529 notch
530 chamber of housing
532 sidewall of housing body
534 extended portion of housing
536 rim
720 inflator housing
721 dimples
722 gas exit end of housing
723 vents
724 receiving end
725 recessed portion of housing body
726 receiving aperture
727 slot
728 reduced portion
729 notch
732 sidewall of housing body
734 extended portion of housing

DETAILED DESCRIPTION

It will be readily understood that the components of the embodiments as generally described and illustrated in the Figures herein could be arranged and designed in a wide variety of different configurations. Thus, the following more detailed description of various embodiments, as represented in the Figures, is not intended to limit the scope of the present disclosure, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The phrases "attached to" or "attached directly to" refer to interaction between two or more entities which are in direct contact with each other or are separated by a fastener.

Inflatable airbag systems are widely used to minimize occupant injury in a collision scenario. Airbag modules have been installed at various locations within a vehicle, including, but not limited to, the steering wheel, the instrument panel, within the side doors or side of seats, adjacent the roof rail of the vehicle, in an overhead position, or at the knee or leg position.

Airbag modules typically comprise an airbag cushion membrane, an inflator, an inflator housing, and an airbag housing. The inflator is typically machine-press fitted into the inflator housing, which is often made of steel or some other metal that is 1 mm or more thick. The inflator and inflator housing are typically mounted within the airbag housing using mounting hardware integrated into, or provided by the inflator housing. The inflator assembly is positioned so that upon triggering of the inflator by vehicle collision sensors, inflation gas will be directed into the cushion membrane, causing it to rapidly expand.

It would be favorable to provide an inflator housing that is lightweight, doesn't require a machine-press fit, may be manufactured from material other than metal, and can be used with inflators that provide mounting hardware. Accordingly, inflator assemblies of the present disclosure are provided, which have some or all of these characteristics.

FIG. 1 depicts one embodiment of an inflator assembly 100 from a side elevation view. Inflator assembly 100 may comprise an inflator 110 and an inflator housing 120.

Inflator 110 may comprise a vent end (not shown) an elongated body 111, an initiator end 114, a first mounting stem 112, and a second mounting stem 113. Inflator 110 may be of any type well known in the art that has mounting hardware as an integrated component of the inflator. Alternatively, an inflator that does not have integrated mounting hardware may be provided with mounting hardware via clamps. Mounting stems 112 and 113 comprise hardware for mounting the inflator within a vehicle, and are depicted as threaded bolts, however, mounting stems 112 and 113 may be pins, nails, clips, studs, or any other suitable type of mounting hardware. Inflator 110 may be used with an initiator, also known as a squib, which may be electrically initiated to trigger a pyrotechnic or similar inflator. Although inflator 110 is depicted as being an elongated cylinder, in actuality it may be of any shape.

Inflator housing 120 may comprise a gas exit end 122, an elongated sidewall 132, and an extended portion 134. Gas exit end 122 may comprise an aperture (not visible in FIG. 1), which comprises the gas exit end of the chamber defined by sidewall 132 of inflator housing 120. Sidewall 132 may comprise a receiving aperture (not visible in FIG. 1) for slideably receiving first stem 112, and an extended portion 134. Extended portion 134 may comprise an inflator receiving aperture 124, recess 125, and a notch (not visible in FIG. 1).

Inflator receiving end 124 comprises an aperture configured to receive inflator 110 within the chamber (see FIG. 4) of inflator housing 120. The inner diameter of inflator receiving end 124 is greater than the outside diameter of inflator 110, such that inflator 110 may be slideably received by inflator housing 120.

Recess 125 may be an additional feature of receiving end 124, and is at least partially defined by extended portion 134. Extended portion 134 and recess 125 enlarge the aperture of receiving end 124 and are configured to allow inflator 110 to be inserted into housing 120 far enough that stem 112 can be received by the receiving aperture (not visible in FIG. 1). The size of recess 125 and length of extended portion 134 as depicted in FIG. 1 are only for illustrative purposes and may be longer or shorter. Further, if inflator 110 can be fully received by housing 120 without recess 125 or extended portion 134, then recess 125 and extended portion 134 may not be present in housing 120. Inflator receiving end 124 may further comprise a notch (not visible in FIG. 1) for receiving second mounting stem 113 of inflator 110.

Inflator housing 120 may comprise a cylindrically shaped piece of steel, which may be about 1 mm to 4 mm thick. In some embodiments, housing 120 may comprise a piece of steel or lightweight metal, such as aluminum, about 3 mm thick. Housing 120 may also comprise a piece of metal less than 3 mm thick. Further, housing 120 may comprise a material other than metal, such as plastic, which may have any suitable thickness.

In the view of FIG. 1, inflator assembly 100 is ready to be mounted in a vehicle structure as part of an airbag assembly, wherein mounting stems 112 and 113 may be received by a bracket, or some other receiving hardware, within a vehicle. If mounting stems 112 and 113 comprise threaded bolts, inflator assembly 100 may be secured within a vehicle by having nuts tightened against the opposite side of a bracket from the assembly.

Figure 2:
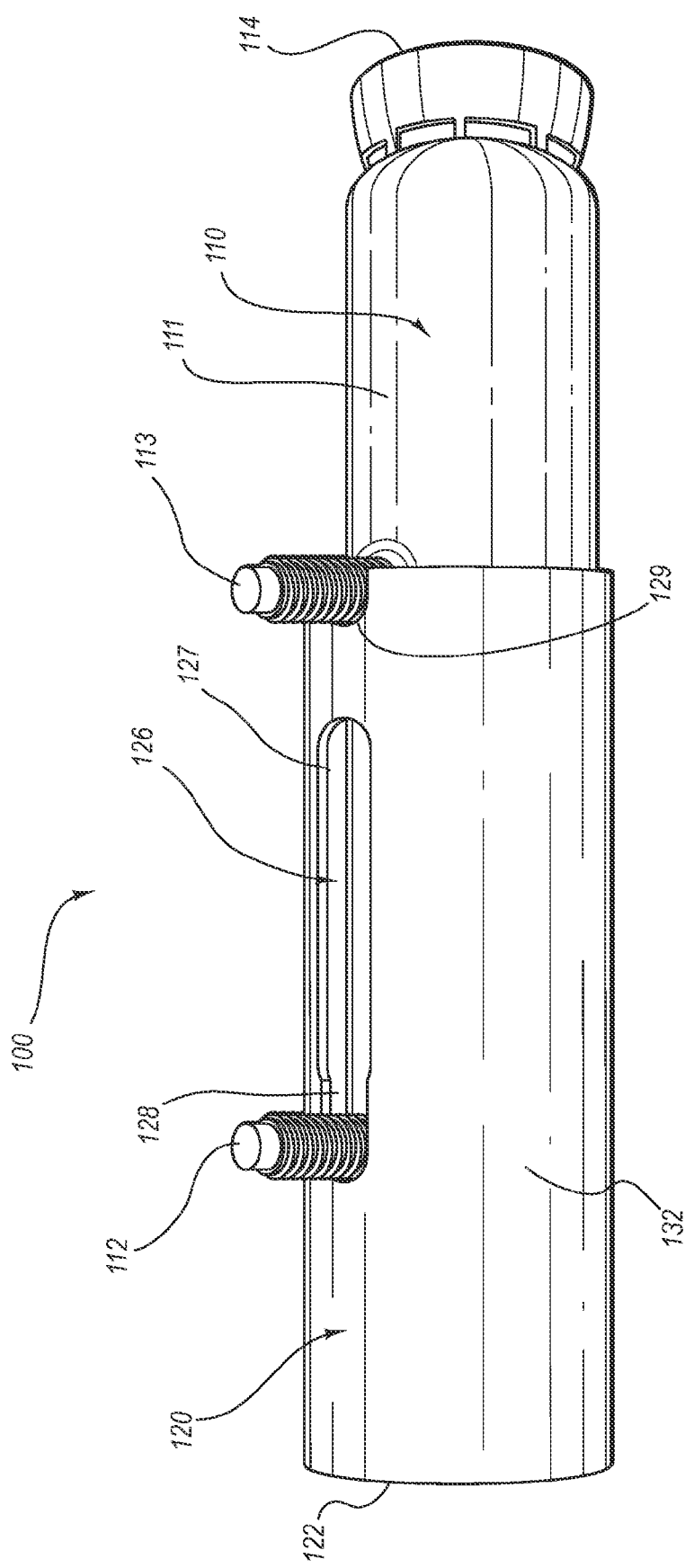
FIG. 2 is a perspective view of the inflator assembly of FIG. 1, wherein the inflator housing has been rotated approximately 180 degrees from the view of FIG. 1.

FIG. 2 is a perspective view of airbag assembly 100, comprising inflator 110 and housing 120. In this view, inflator assembly 100 has been rotated approximately 180° from the view of FIG. 1. Inflator 110 has been fully received by inflator housing 120. Accordingly, the vent end of the inflator, and the first and second mounting stems, depicted as bolts 112 and 113 have been received, leaving the initiator end 114 portion of inflator body 111 visible outside inflator housing 120.

Visible in this view are possible components of inflator housing 120 that were not visible in FIG. 1. Sidewall of housing body 132 may comprise a receiving aperture 126 and a notch 129. Both receiving aperture 126 and notch 129 are configured to slideably receive first and second mounting bolts, respectively. Receiving aperture 126 and notch 129 may be described as being longitudinally co-linear. Receiving aperture 126 may further comprise a receiving slot 127, and a reduced portion 128 which may slideably receive stem 112 and may form a human-scale friction or interference fit with stem 112.

A human-scale interference fit is hereby defined as meaning an interference fit that can be achieved manually by a person. Thus, no machinery is needed to fully slide inflator 110 into housing 120 and a manufacturing station can be eliminated compared to inflator housings which require a press-fit via pneumatically powered equipment. The interference fit is sufficient that housing 120 does not slide off inflator 110, when the inflator assembly is inverted with housing end 122 pointing down.

Further, reduced portion 128 may limit the extent to which inflator 110 can be received by housing 120 in the direction of gas exit end 122. Additionally, reduced portion 128 may help to limit the radial rotation of inflator 110 within housing 120.

Notch 129 may be a component of receiving end 124. Notch 129 may be U-shaped, or any other suitable shape. Notch 129 is configured to slideably receive stem 113, and may limit the extent to which inflator 110 may be received by housing 120, in the direction of gas exit end 122. Notch 129 may help to restrict the radial rotation of inflator 110 within housing 120. Further, notch 129 may comprise a human-scale interference fit, or may receive stem 113 loosely.

The total magnitude of the interference fit between reduced portion 128 and stem 112, and between notch 129 and stem 113 (if such an interference fit is present) is of human-scale. The depths of reduced portion 128 and notch 129, and the distance between them as depicted in FIG. 2, are for illustrative purposes only, and may vary. Mounting stems 112 and 113 may further comprise a non-threaded area near the base of the hardware near the inflator, which is configured to receive reduced portion 128 and notch 129.

Figure 3:
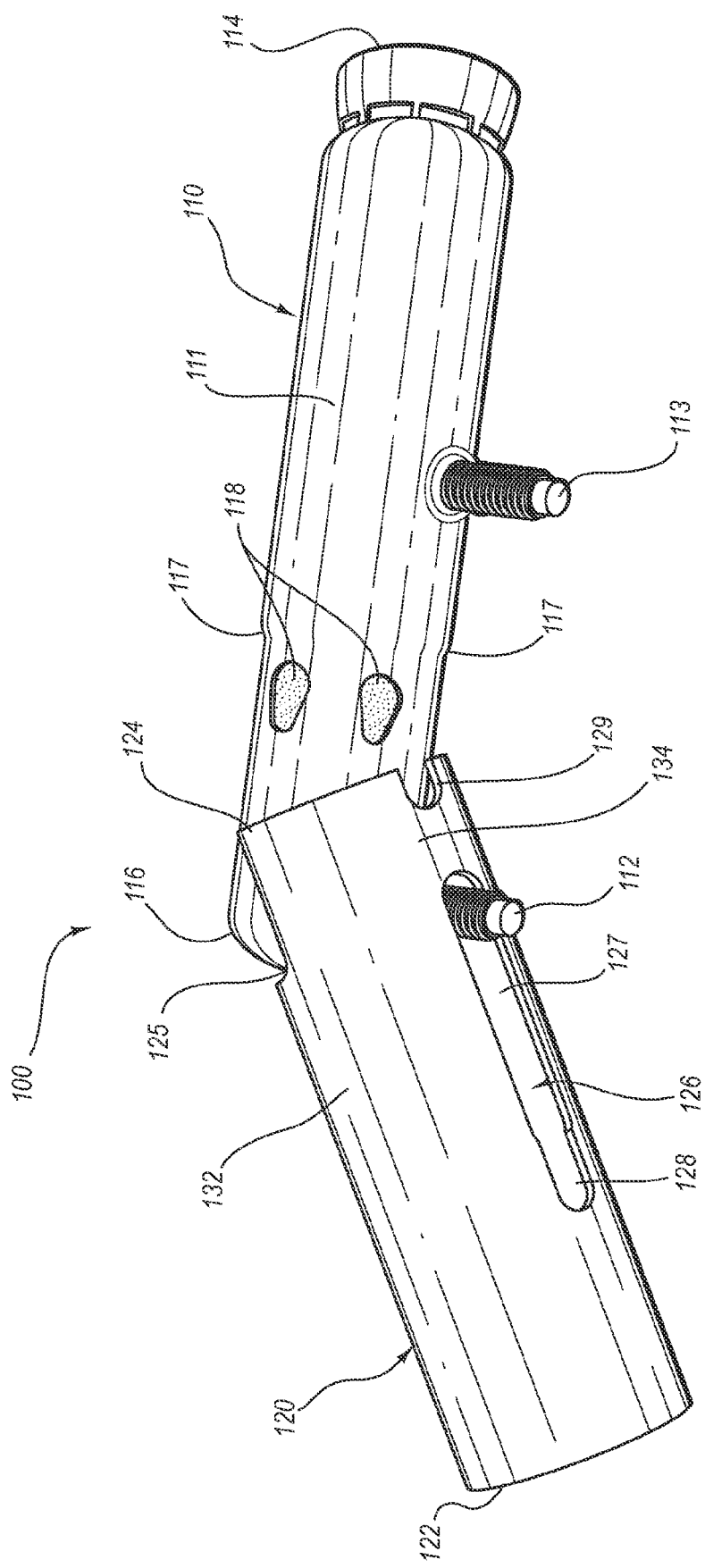
FIG. 3 is perspective view of the inflator assembly of FIG. 1 illustrating how the inflator may be inserted into the inflator housing, and be slideably received by the housing.

FIG. 3 is a perspective view of inflator assembly 100, wherein inflator 110 has not yet been fully received by housing 120. Inflator 110 may comprise an elongated body 111 into which mounting bolts 112 and 113 are integrated, a diffuser end 116, a shoulder 117, diffuser holes for the escape of inflation gas, 118, and an initiator end 114.

Inflator 110 may be initially inserted into housing 120 by aligning diffuser end 116 of inflator 110 with receiving end 124 of housing 120 such that they are roughly co-linear along their long axis. Extended portion 134 of inflator housing sidewall 132 partially defines recess 125, which may allow clearance for diffuser end 116 of inflator such that stem 112 may be placed into receiving aperture 126 at slot 127. Inflator 110 is then rotated such that the long axis of inflator 110 is aligned with the long axis of the chamber of housing 120. Then inflator 110 may be pushed toward housing 120 gas exit end 122 until stem 112 is near reduced portion 128 and stem 113 is near notch 129. Then, if needed, housing 120 and inflator 110 may be radially aligned such that notch 129 will receive stem 113. Then inflator 110 may be pushed in the direction of gas exit end 122 until stem 112 is fully received by reduced portion 128 and stem 113 is fully received by notch 129.

Figure 4:
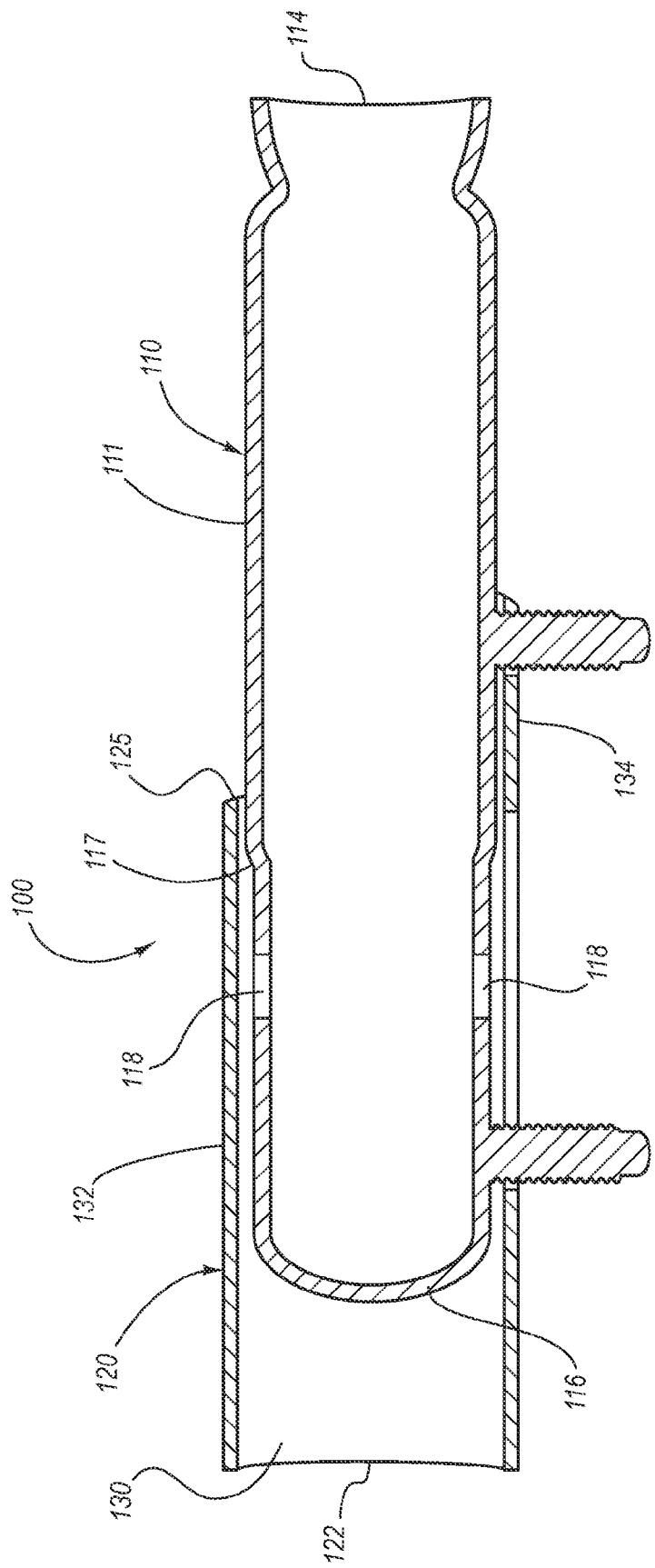
FIG. 4 is a side elevation cutaway view of the inflator assembly of FIG. 1.

FIG. 4 is a side elevation cutaway view of inflator assembly 100, wherein inflator 110 has been fully received by housing 120. Sidewall 132 completely surrounds inflator 110 from shoulder 117 to diffuser end 116. FIG. 4 depicts recess 125 of housing 120 extending past shoulder 117 in the initiator end 114 longitudinal direction, however, shoulder 117 may comprise the extent to which housing 120 extends on inflator 110.

In the depiction of FIG. 4, inflator 110 nearly touches sidewall 132 of housing 120 at recess 125, near shoulder 117. In alternative embodiments, there may be a greater space between inflator body 111 and sidewall 132, or housing sidewall 132 may be configured to contact inflator body 111 at shoulder 117, and comprise an airtight human-scale interference fit. In the view of FIG. 4, sidewall of inflator housing body 132 comprises a cylindrical shape that is linear along its long axis, however in other embodiments, the shape of housing 120 may conform to the shape of inflator 110, including shoulder 117, such that housing sidewall 132 may further comprise a shoulder. In such an alternative embodiment, housing sidewall 132 may contact inflator shoulder 117 at the housing shoulder. Further, inflator 110 may comprise a different shape than that depicted in FIG. 4, and the shape of housing 120 may be altered to conform to any shaped inflator, or may be configured to be used with many different shaped inflators. Further, housing 120 may extend beyond diffuser end 116 substantially more or less than depicted. Thus the portion of housing 120 that extends beyond diffuser end 116 may be longer than the portion of housing 120 that covers inflator 110.

Gas exit end 122 may comprise an aperture which is defined by the full area of the inner surface of sidewall 132 of inflator housing 120, or alternatively, sidewall 132 may be bent, crimped radially inwardly, or formed in a mold, such that gas exit end 122 may comprise a smaller aperture. Further, gas exit end 122 may be configured such that inflator housing sidewall 132 comprises a closed longitudinal end at gas exit end 122, which forms an airtight closure configured to block the exit of inflation gas. In such an embodiment, inflator housing sidewall 132 may comprise one or more apertures, which may be disposed on the long surface of sidewall 132 near gas exit end 122. Alternatively, gas exit end 122 may additionally comprise an end-cap.

When inflator 110 is triggered, inflation gas rapidly exits inflator 110 via diffuser holes. Inflation gas then turns approximately 90 degrees and may exit via gas exit end 122, and the space between inflator housing sidewall 132 and inflator 110 at recessed area 125. Embodiments in which housing 120 touches the inflator at or near shoulder 117, or forms a human-scale interference fit with the inflator body, inflation gas may only exit via end 122. In some airbag applications it may be favorable to direct inflation gas towards or away from specific areas of the airbag, thus, in some embodiments, housing sidewall 132 may not comprise a straight cylinder, but gas exit end 122 may be angled in any direction. Further, vents disposed on the long surface of inflator housing sidewall 132 may be disposed as to direct inflation gas in a predetermined direction.

FIG. 5 is a perspective view of another embodiment of an inflator housing 520. Inflator housing 520 is configured to be used with an inflator such as inflator 110, depicted in FIGS. 1-4, wherein the inflator comprises integrated mounting hardware. Housing 520 may comprise ribs 521, a gas exit end 522, an inflator receiving end 524, and a hardware receiving aperture 526. Receiving end 524 comprises an aperture for receiving an inflator, a recessed portion 525, and a notch 529.

Housing 520 is configured to receive an inflator in a manner similar to housing 120, wherein the vent end of the inflator is inserted into receiving end 524 of inflator housing 520. Extended portion 534 creates a recess 525, which allows sufficient clearance for a mounting bolt of the inflator to be received through receiving aperture 526 at slot 527. The inflator may then be aligned with housing 520 and slid toward gas exit end 522 until reduced portion 528 and notch 529 fully receive the inflator mounting hardware. Reduced portion 528 and/or notch 529 may comprise a human-scale interference fit with the inflator or they may loosely receive the inflator.

Ribs 521 are inwardly projecting protrusions, which may be produced by stamping or may be incorporated in a mold at the time of manufacture. Thus, ribs 521 may comprise concavities on the external surface of housing body sidewall 532, and convexities on the internal surface. At least one pair of diametrically opposed ribs 521 may help to center an inflator within the chamber of housing 520 to produce uniform flow of inflation gas as it exits housing 520. Alternatively, ribs may not center the inflator within the chamber, but may position the inflator in a predetermined manner. The number and position of ribs 521 depicted in FIG. 5 are strictly for illustrative purposes and may vary. Ribs 521 may comprise a human-scale interference fit with the inflator. The total magnitude of the possible interference fits between housing 520 and an inflator are configured to be human-scale, such that a worker can manually seat an inflator within housing 520.

Gas exit end 522 is distal to the inflator, and proximal to inflator vents. End 522 may comprise a completely open aperture defined by rim 536, an aperture which is smaller than the inner diameter of the housing, or end 522 may be completely closed. In an embodiment, wherein end 522 is completely closed, housing 520 may further comprise vents for the exit of inflation gas, such as those found in the embodiment depicted in FIG. 7.

FIG. 6 is a side elevation cutaway view of an inflator assembly 500, comprising inflator housing 520 of FIG. 5, wherein an inflator 510 has been fully received by inflator housing 520. Inflator body 511 is centered within inflator 520 by ribs 521 such that inflation gas may flow uniformly within housing 520 and during exit of housing 520. The depth of ribs 521 are configured to allow for penetration of bolt 512 through reduced portion 528 sufficient for mounting of inflator assembly 500 to a vehicle structure.

In the view provided by FIG. 5, receiving end 524 of inflator housing sidewall 532 may be viewed as having an "L" shape with a vertical arm and a horizontal arm. Extended portion 534 is the horizontal arm and the segment of the sidewall surrounding recessed portion 525 is the vertical arm. Notch 529 and a segment of receiving slot portion 527 of receiving aperture 526 are at the horizontal arm of the "L" shape. Note that recessed portion 525 is at least partially defined by the extended portion of the sidewall, namely the parallel longitudinal edges which are separated by a rim. The rim is the terminal edge of sidewall 532 and also at least partially defines recessed portion 525. Opposite recessed portion 525 are notch 529 and a segment of slot portion 527 of receiving aperture 526. More particularly, a segment of receiving slot portion 527 of receiving aperture 526 extends toward receiving end beyond the rim of the sidewall. This configuration permits first mounting stem 112 to be inserted into slot portion 527 as diffuser end 116 of inflator 100 is inserted into chamber 530 of inflator housing 520.

Figure 7:
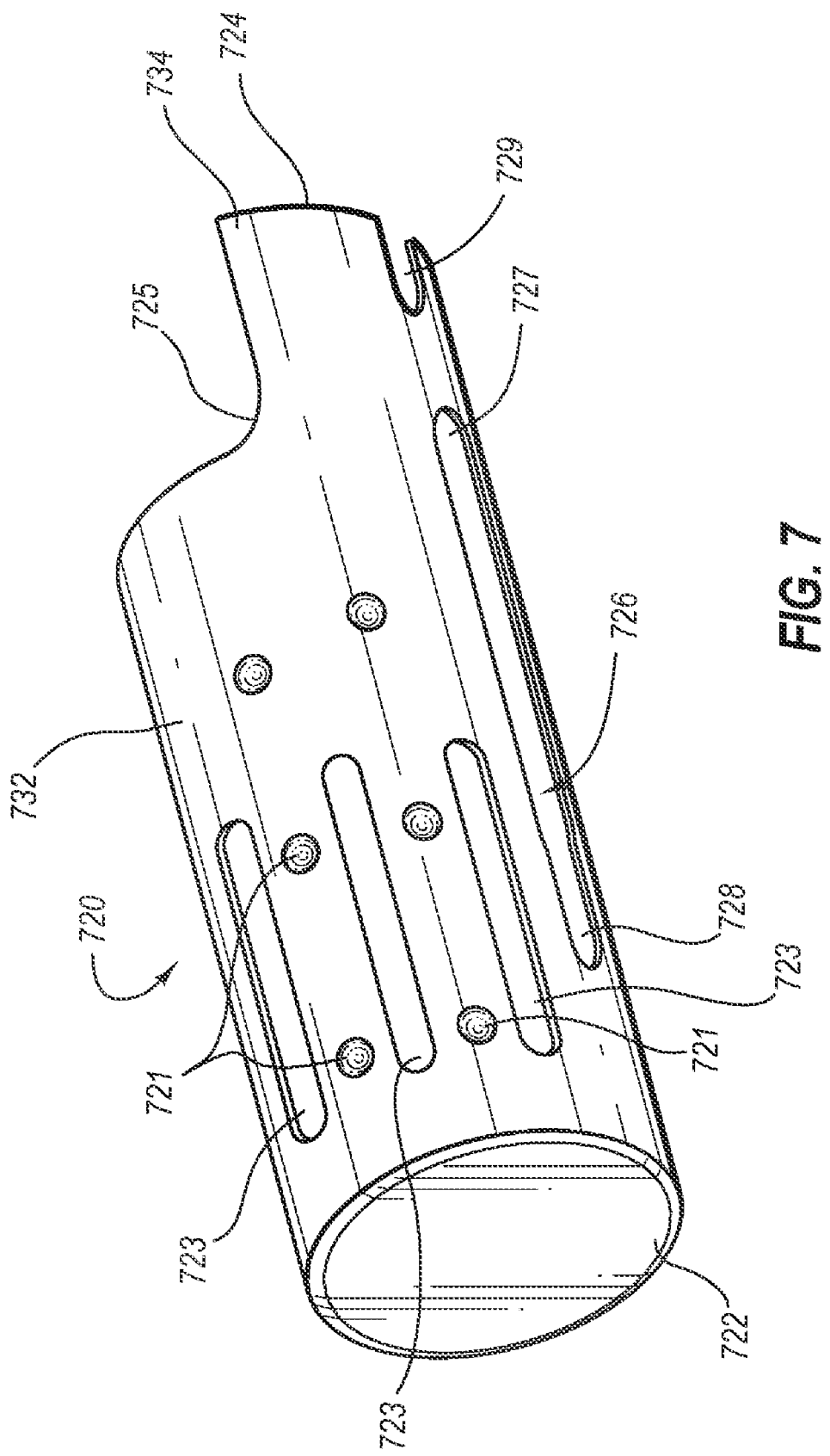
FIG. 7 is a perspective view of another embodiment of an inflator housing.

FIG. 7 is a perspective view of another embodiment of an inflator housing 720. Housing 720 comprises a sidewall 732, which may further comprise dimples 721, a gas exit end 722, vents 723, an inflator receiving end 724, an extended portion 734, a recessed portion 725, a hardware receiving aperture 726, a slot 727, a reduced portion 728, and a notch 729. Housing 720 is configured to receive an inflator in a manner similar to housings 120 and 520.

Gas exit end 722 is solid and completely closed off such that inflation gas may not exit via end 722 and must exit via vents 723, which are in fluid communication with the chamber of housing 720. Vents 723 may be disposed all around housing 720, or may be configured to specifically direct inflation gas in a predetermined direction such that vents 723 are only disposed on one side of housing 720.

FIG. 7 depicts a plurality of vents 723, however, there may be any number of vents depending on the specific application. For instance, it may be favorable for inflation gas to be widely dispersed as it exits housing 720, thus, housing 720 may comprise many vents disposed all over housing 720. Conversely, it may be favorable to have a single focused stream of inflation gas targeted to a particular portion of the airbag, in which case, housing 720 may comprise a single gas exit vent 723 configured to direct inflation gas in a predetermined manner. Additionally, housing 720 may not be a linear cylinder as depicted in FIG. 7, but may be angled in any direction.

Dimples 721 comprise inwardly projecting protrusions similar to ribs 521, which are concave on the external sidewall 732 of housing 720 and convex on the internal surface. Dimples 721 may center an inflator within the chamber of housing 720, or may position an inflator in a predetermined orientation within the chamber of housing 720. The number and location of dimples 721 may vary compared to FIG. 7. Further, dimples 721 may not be present.

Housing 720 may comprise a piece of steel about 1 mm or more thick. Alternatively, housing 720 may comprise a piece of steel, or other metal about 1 mm thick, or less. Further, housing 720 may comprise a non-metal piece, such as plastic, which may be of any suitable thickness.

Without further elaboration, it is believed that one skilled in the art can use the preceding description to utilize the present disclosure to its fullest extent. The examples and embodiments disclosed herein are to be construed as merely illustrative and not a limitation of the scope of the present disclosure in any way. It will be apparent to those having skill in the art that changes may be made to the details of the above-described embodiments without departing from the underlying principles of the disclosure described herein. In other words, various modifications and improvements of the embodiments specifically disclosed in the description above are within the scope of the appended claims. Note that elements recited in means-plus-function format are intended to be construed in accordance with 35 U.S.C. §112 ¶6. The scope of the invention is therefore defined by the following claims.

What is claimed is:

1. An airbag inflator assembly, comprising;
an airbag inflator with a first mounting stem and a second mounting stem for mounting the inflator in a vehicle, the first mounting stem being more proximal to a gas exit end of the inflator,
wherein the airbag inflator has a longitudinal axis and wherein the first mounting stem and the second mounting stem extend transversely with respect to the longitudinal axis and are aligned with each other along a line that is parallel to the longitudinal axis; and
an inflator housing with two opposing end portions, the inflator housing comprising a sidewall, which defines a chamber configured to slideably receive the inflator within the chamber of the inflator housing, the sidewall further comprising:
a receiving aperture for receiving the first mounting stem, wherein the receiving aperture comprises a receiving slot that is elongated and extends parallel with a longitudinal axis of the chamber of the inflator housing; and,
an extended portion at an inflator receiving end of the inflator housing,
wherein the extended portion defines a recessed portion of inflator housing,
wherein the recessed portion is configured to permit only a single end of the airbag inflator to be initially inserted into the chamber of the inflator housing and to simultaneously permit the first mounting stem to be inserted though the receiving slot such that the first mounting stem may then be moved in the receiving slot as the inflator is slideably advanced within the chamber of the inflator housing along their longitudinal axes.

2. The inflator assembly of claim 1, wherein the recessed portion is configured such that, after the end of the airbag inflator is inserted into the chamber of the inflator housing and the first mounting stem has been inserted through the receiving slot, but before the inflator is slideably advanced with the chamber of the inflator housing, rotation may occur between the inflator and the inflator housing such that the longitudinal axis of the inflator becomes aligned with the longitudinal axis of the chamber of the housing.

3. The inflator assembly of claim 1, further comprising a notch located in the extended portion opposite from the reduced portion, wherein the notch is configured to receive the second mounting stem and to form an interference fit with the second mounting stem of such a magnitude that a person may manually fully seat the inflator within the chamber of the inflator housing.

4. The inflator assembly of claim 1, wherein a plurality of inwardly projecting protrusions extending from the sidewall of the inflator housing are configured to center the inflator within the inflator housing.

5. The inflator assembly of claim 4, wherein the inwardly projecting protrusions form an interference fit between the inflator and the sidewall of the inflator housing of a magnitude such that a person can manually and fully seat the inflator within the inflator housing.

6. An airbag inflator assembly, comprising;
an airbag inflator with a first mounting stem and a second mounting stem for mounting the inflator in a vehicle, the first mounting stem being more proximal to a diffuser end of the inflator,
wherein the airbag inflator has a longitudinal axis and wherein the first mounting stem and the second mounting stem extend transversely with respect to the longitudinal axis and are aligned with each other along a line that is parallel to the longitudinal axis; and
an inflator housing with two opposing end portions, the inflator housing comprising a sidewall, which defines a chamber configured to slideably receive the inflator within the chamber of the inflator housing, the sidewall further comprising:
a receiving aperture for receiving the first mounting stem, wherein the receiving aperture comprises a receiving slot that is elongated and extends parallel with a longitudinal axis of the chamber of the inflator housing, wherein the receiving aperture permits an interference fit with the first mounting stem of such a magnitude that a person may manually achieve the interference fit;
a notch configured to receive the second inflator mounting stem, wherein the notch is longitudinally co-linear with the receiving aperture; and
an extended portion at an inflator receiving end of the inflator housing,
wherein the extended portion defines a recessed portion of inflator housing,
wherein the recessed portion is configured to permit only a single end of the airbag inflator to be initially inserted into the chamber of the inflator housing and to simultaneously permit the first mounting stem to be inserted though the receiving slot such that the first mounting stem may then be moved in the receiving slot as the inflator is slideably advanced within the chamber of the inflator housing along their longitudinal axes until the interference fit is achieved.

7. The inflator assembly of claim 6, wherein the receiving aperture comprises a reduced portion, wherein the reduced portion is located at the end of the receiving aperture longitudinally closest to a gas exit end of the inflator housing, wherein the reduced portion is configured to slideably receive the first mounting stem in an interference fit to act as a stop for the first mounting stem to limit insertion of the inflator into the chamber of the inflator housing in the direction of the gas exit end.

8. The inflator assembly of claim 6, wherein the notch is configured to act as a stop for the second mounting stem as the interference fit is achieved between the first mounting stem and the receiving aperture.

9. An inflator assembly, comprising;
an airbag inflator with a first mounting stem and a second mounting stem, wherein each mounting stem is configured to mount the inflator assembly in a vehicle, wherein the first mounting stem is more proximal to a diffuser end of the inflator than the second mounting stem; and
an inflator housing with two opposing end portions, the inflator housing comprising a sidewall which defines a chamber, wherein the chamber is configured to slideably receive the inflator, the sidewall further comprising:
an inflator receiving end having an inside perimeter larger than an outside perimeter of the inflator, the inflator receiving end comprising an aperture for receiving the inflator into the chamber of the inflator housing along the longitudinal axis of the inflator housing;
a gas exit end disposed on the opposite longitudinal end of the inflator housing from the receiving end, the gas exit end comprising at least one aperture, which is in fluid communication with the chamber;
a receiving aperture configured to receive the first mounting stem, wherein the receiving aperture comprises a receiving slot and a reduced portion, wherein the reduced portion is located at the end of the receiving aperture longitudinally closest to the gas exit end of the inflator housing, wherein the reduced portion is configured to slideably receive the first mounting stem; and
a notch disposed on the inflator receiving end of the inflator housing sidewall and is longitudinally aligned with the receiving aperture, wherein the notch is configured to receive the second inflator mounting stem.

10. The inflator assembly of claim 9, wherein the receiving slot of the receiving aperture comprises an elongated slot, having a width larger than that of the first mounting stem, such that it may freely receive the first mounting stem.

11. The inflator assembly of claim 9, wherein the reduced portion of the receiving aperture is U-shaped.

12. The inflator assembly of claim 9, wherein the reduced portion of the receiving aperture acts as a stop for the first mounting stem to limit insertion of the inflator into the chamber of the inflator housing in the direction of the inflator housing gas exit end.

13. The inflator assembly of claim 9, wherein the reduced portion of the receiving aperture and the first mounting stem form an the interference fit of such a magnitude that a person may manually fully seat the inflator within the housing.

14. The inflator assembly of claim 9, wherein the inflator housing sidewall further comprises a recess at least partially defined by an extended portion of the sidewall, wherein the extended portion defines the notch, wherein the notch is opposite the recess.

15. The inflator assembly of claim 9, wherein a segment of the slot portion of the receiving aperture is opposite the recess such that the first mounting stem can be inserted into the slot portion as the diffuser end of the inflator is inserted into the chamber of the inflator housing.

16. The inflator assembly of claim 9, wherein the extended portion is configured such that the receiving end of the inflator housing sidewall defines an "L" shape with a vertical arm and a horizontal arm, wherein the extended portion is the horizontal arm, wherein a segment of the sidewall surrounding the recess is the vertical arm, wherein the notch and a segment of the receiving slot portion of the receiving aperture are at the horizontal arm of the "L" shape.

17. The inflator assembly of claim 9, wherein the inflator housing sidewall comprises plastic.

18. The inflator assembly of claim 9, wherein the inflator housing sidewall comprises an aluminum alloy.

19. The inflator assembly of claim 9, wherein more than half of the longitudinal length of the inflator is received within the chamber of the inflator housing.

20. The inflator assembly of claim 9, wherein both the reduced portion of the receiving aperture and the notch of the receiving end of the inflator housing sidewall respectively form interference fits with the first mounting stem and the second mounting stem, wherein the total magnitude of the interference fits permit a person to manually and fully seat the inflator within the housing.

21. The inflator assembly of claim 9, wherein the inflator housing sidewall further comprises a plurality of inwardly projecting protrusions which form an interference fit with a body portion of the inflator,
wherein the reduced portion of the receiving aperture forms an interference fit with the first mounting stem, and
wherein both interference fits combine to have a magnitude such that a person may manually and fully seat the inflator within the inflator housing.

22. The inflator assembly of claim 9, wherein the inflator housing sidewall further comprises a plurality of inwardly projecting protrusions which form an interference fit with a body portion of the inflator,
wherein the notch of the receiving end of the inflator housing sidewall forms an interference fit with the second mounting stem, and
wherein both interference fits combine to have a magnitude such that a person may manually and fully seat the inflator within the inflator housing.

23. The inflator assembly of claim 9, wherein the gas exit end of the inflator housing sidewall comprises an aperture which is defined by the inner perimeter of the inflator housing sidewall.

24. The inflator assembly of claim 9, wherein the at least one aperture at the gas exit end of the inflator housing comprises one or more vents disposed on a longitudinal surface of the sidewall, wherein the gas exit end is closed other than the one or more vents such that inflation gas can only exit from the chamber of the inflator housing via the one or more vents.

25. A method of assembling an inflator assembly, comprising:

providing an inflator with a first and a second mounting stem, the first mounting stem disposed nearer a vent end of the inflator relative to the second mounting stem;

providing an inflator housing configured to slideably receive the inflator within a chamber of the inflator housing;

placing the first mounting stem into a receiving aperture of the inflator housing;

pivoting the inflator relative to the inflator housing until the inflator is longitudinally aligned within the chamber;

sliding the inflator in the chamber of the inflator housing until the first mounting stem is near a reduced portion of the receiving aperture and the second mounting stem is near a notch of the inflator housing;

aligning the second mounting stem with the notch; and sliding the inflator further into the chamber of the inflator housing until the first mounting stem is fully received by a reduced portion in the receiving aperture and the second mounting stem is fully received by the notch.

\* \* \* \* \*